United States Patent [19]

Mozawa et al.

[11] Patent Number: 5,197,243
[45] Date of Patent: Mar. 30, 1993

[54] WINDOW FOR AUTOMOBILES OR THE LIKE, AND METHOD OF MANUFACTURING THE SAME

[75] Inventors: Toshiyuki Mozawa; Tatsuya Tamura, both of Yokohama, Japan

[73] Assignee: Hashimoto Forming Industry Co., Ltd., Japan

[21] Appl. No.: 442,642

[22] Filed: Nov. 29, 1989

[30] Foreign Application Priority Data

Nov. 30, 1988 [JP] Japan ............... 63-303632
Nov. 30, 1988 [JP] Japan ............... 63-303633
Nov. 30, 1988 [JP] Japan ............... 63-303636
Nov. 30, 1988 [JP] Japan ............... 63-303637

[51] Int. Cl.[5] ............................. B60J 1/00
[52] U.S. Cl. ................................. 52/208
[58] Field of Search ........... 52/208, 312, 400, 397, 52/716; 296/84 R, 84 D

[56] References Cited

U.S. PATENT DOCUMENTS

| | | |
|---|---|---|
| 3,161,436 | 12/1964 | Hood . |
| 3,375,626 | 4/1968 | Grotefeld et al. .......... 52/400 |
| 3,770,545 | 11/1973 | Jackson ..................... 52/312 |
| 3,851,432 | 12/1974 | Griffin ........................ 52/400 |
| 4,022,663 | 8/1977 | Harder, Jr. . |
| 4,072,340 | 2/1978 | Morgan ...................... 52/208 |
| 4,274,237 | 6/1981 | Hagstrom ................... 52/312 |

FOREIGN PATENT DOCUMENTS

| | | |
|---|---|---|
| 0046002 | 1/1981 | European Pat. Off. . |
| 0310262 | 9/1988 | European Pat. Off. . |
| 1659644 | 7/1974 | Fed. Rep. of Germany . |
| 1374552 | 9/1963 | France . |
| 62-251229 | 11/1987 | Japan . |
| 62-257831 | 11/1987 | Japan . |
| 63-112143 | 5/1988 | Japan . |
| 2147244 | 9/1983 | United Kingdom . |
| 8804985 | 7/1988 | World Int. Prop. O. . |

Primary Examiner—David A. Scherbel
Assistant Examiner—Michele A. Van Patten
Attorney, Agent, or Firm—Stevens, Davis, Miller & Mosher

[57] ABSTRACT

A window for automobiles or the like includes a window plate and an integral frame member along at least one edge of the window plate. The window is manufactured by preparing a window plate and a pre-shaped frame body which comprises a main portion and a surface layer covering an outer side of the main portion. The main portion of the pre-shaped frame body is composed of a thermoplastic synthetic resin material having a relatively high dielectric loss and containing a heat foamable agent therein. The surface layer is composed of a non-foamable thermoplastic synthetic resin material. The pre-shaped frame body is subjected to a dielectric heating in a mold, to cause the foamable agent in the main portion of the pre-shaped frame body to expand in the mold cavity. The resultant frame member of the window comprises a main portion composed essentially of a foamed thermoplastic synthetic resin material, which is covered on its outer side by a surface layer composed essentially of a non-foamed thermoplastic synthetic resin material.

16 Claims, 12 Drawing Sheets

FIG_8

FIG_9

FIG_12

FIG_13

FIG_14A

FIG_14B

FIG_15A

FIG_15B

FIG_16

FIG_17

WINDOW FOR AUTOMOBILES OR THE LIKE, AND METHOD OF MANUFACTURING THE SAME

BACKGROUND OF THE INVENTION

1. Field of the Invention

The present invention relates to a window for automobiles or the like, including a window plate and a frame member provided integrally therewith, and also to a method of manufacturing such windows.

2. Description of the Related Art

Automobile windows wherein a window plate is integrally provided with a frame member is advantageous in that, since it is not necessary to prepare a window molding member as a separate component from the window plate, and number of components and assembly steps can be reduced to realize an improved manufacturing productivity in the assembly lines of automobile factories.

There is disclosed, e.g. in Japanese Patent applications, laid-open publication Nos. 58-113,480 and 63-112,143 and in Japanese Utility Model Application Laid-open Publication No. 62-118,724 a method of manufacturing such automobile windows, wherein the peripheral edge of a window plate is placed in the cavity of an injection mold, and the frame member is formed by a injection molding process, i.e. by injecting a synthetic resin material into the mold cavity. This known method suffers from a problem that the window plate tends to be subjected to damages due to a high injection pressure of the resin material.

Another method of manufacturing such windows is disclosed in Japanese Patent application Laid-open Publication Nos. 62-251,229; 62-257,831 and 63-112,143, wherein an elongate pre-shaped frame body of a constant cross-section is prepared separately from the window plate, from a thermoplastic synthetic resin material having a relatively high dielectric loss and containing a heat foamable agent therein, such that the foamable agent is maintained in a state in which it has not been substantially foamed. The pre-shaped frame body is secured to and along at least one peripheral edge of the window late, is placed in a mold cavity together with the relevant edges of the window plate, and is then applied with a high frequency voltage to cause the foamable agent to evaporate and expand within the mold cavity.

The above-mentioned method effectively prevent the window plate from damages since the window plate is not subjected to a high injection pressure as mentioned above. On the other hand, the known method is inevitably accompanied by formation of a number of bubbles in the interior of the frame body, though the size of the bubbles gradually decreases as their location comes closer to the outer surface of the frame member. The presence of a so-called skin layer, which includes a number of bubbles of a relatively small size near the outer surface of the frame member, is quite troublesome from a practical viewpoint for the following reasons. That is, it is often difficult to achieve a desired smooth and uniform appearance of the frame member, or to satisfactorily prevent formation of pinholes in the outer surface of the frame member without requiring strict control of the process conditions. Moreover, in the event that the outer surface of the frame member is to be subjected to painting and subsequent baking steps, the bubbles near the outer surface of the frame member tend to undergo an excessive expansion due to an elevated temperature during the baking, significantly deteriorating the desired ornamental appearance of the frame member.

SUMMARY OF THE INVENTION

It is therefore a primary object of the present invention to provide a novel and improved window for automobiles or the like, which includes a frame member arranged integrally with the window plate and having a smooth and uniform ornamental appearance, and which can be readily manufactured without the above-mentioned drawbacks.

Another object of the present invention is to provide a novel and improved method of manufacturing windows for automobiles or the like, including a frame member arranged integrally with the window plate, which makes it readily possible to manufacture the windows without accompanying damages to the window plate or without deteriorating a smooth and uniform ornamental appearance of the frame member.

To this end, according to one aspect of the present invention, three is provided a window for automobiles or the like, including a window plate and a frame member formed into a predetermined shape so as to be integral with the window plate along at least one edge thereof, wherein said frame member comprises a main portion composed essentially of a foamed thermoplastic synthetic resin material and covered on its outer side by a surface layer composed essentially of a non-foamed thermoplastic synthetic resin material.

Furthermore, according to an other aspect of the present invention, there is provided a method of manufacturing windows for automobiles or the like, each including a window plate and a frame member composed essentially of a thermoplastic synthetic resin material formed into a predetermined shape so as to be integral with the window plate along at least one edge thereof, said frame member comprising a foamed main portion covered by a non-foamed surface layer on its outer side, wherein the method comprises the steps of:

(A) preparing a window plate of a desired shape;

(B) forming a pre-shaped frame body including a main portion composed of a thermoplastic synthetic resin material having a relatively high dielectric loss and containing a heat foamable agent therein, and a surface layer covering an outer side of the main portion and composed of a non-foamable thermoplastic synthetic resin material, while maintaining said foamable agent in the main portion in a substantially unfoamed state;

(C) temporarily securing the pre-shaped frame body onto and along the edge of the window plate;

(D) placing the pre-shaped frame body in a cavity of a mold composed at least partly of a material having a relatively low dielectric loss, together with at least that region of the window plate which is adjacent to the pre-shaped frame body; and (E) subsequently applying a high frequency voltage to a predetermined region of the mold, thereby to heat the pre-shaped frame body and cause the foamable agent in the main portion to evaporate and expand within the cavity.

The above-mentioned structure of the window according to the present invention is advantageous in that the foamed main portion of the frame member serves to substantially absorb impact forces applied to the window plate, thereby effectively protecting the window plate from damages when it is mounted is place, e.g. on automobile body panel, and that the non-foamed layer on the foamed main body covers the skin layer of the foamed main body including a number of bubbles, to readily realize a refined ornamental appearance of the frame member with a uniformly smooth outer surface without pinholes. The window can be manufactured without applying to the window plate a high injection pressure and hence without subjecting the window plate to damages. By subjecting the pre-shaped frame body to a dielectric heating during the manufacture of the window, the foamed main portion and the non-foamed layer of the frame member can be integrally connected with each other.

DETAILED EXPLANATION OF THE PREFERRED EMBODIMENTS

The present invention will now be explained in further detail, by referring to some preferred embodiments shown in the accompanying drawings.

Figure 1:
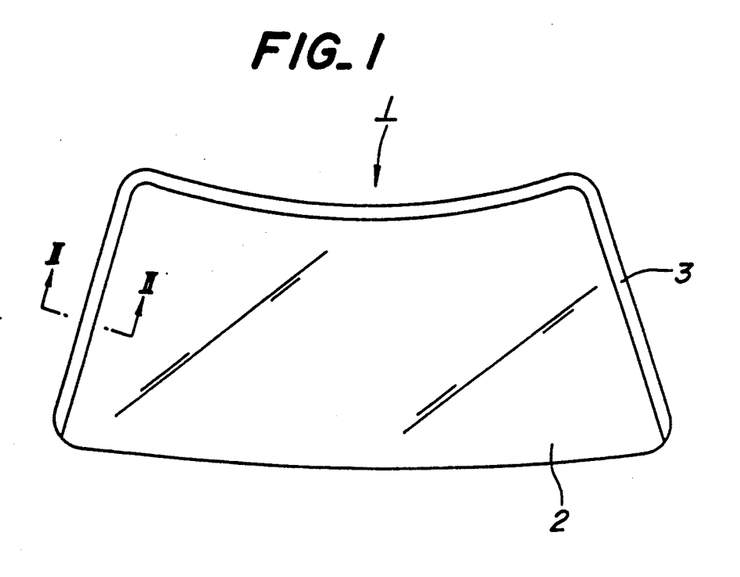
FIG. 1 is a front view of an automobile front window according to one embodiment of the present invention.
Figure 2:
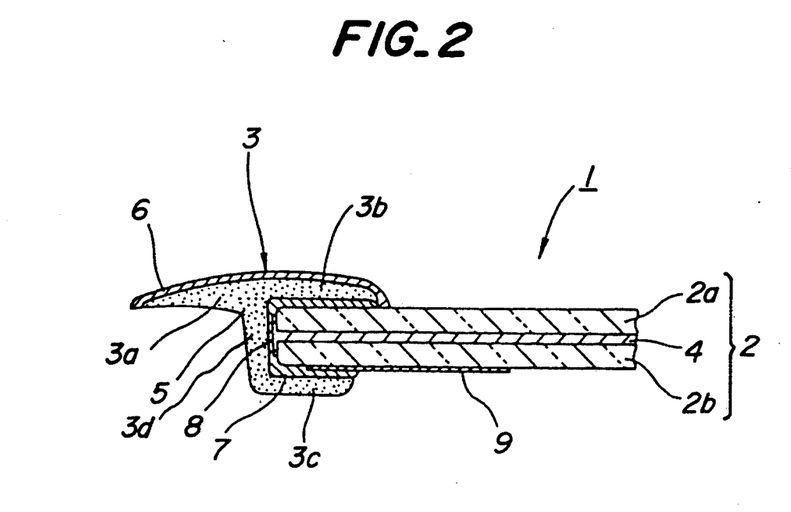
FIG. 2 is a cross-sectional view taken along the line II—II in FIG. 1.

There is shown in FIGS. 1 and 2 an automobile front window according to one embodiment of the present invention, which is designated as a whole by reference numeral 1 and which includes a window plate 2 and a frame member 3 formed integrally with the window plate 2 to extend along side and upper edges thereof.

The window plate 2 may be of a laminated structure including front and rear transparent sheets 2a, 2b composed of inorganic glass or appropriate synthetic resin material like acrylic resin, which are arranged on both sides of, and laminated with an intermediate film 4 which, in turn, is composed of transparent and adhesive thermoplastic synthetic resin material, such as polyvinylbutyral resin.

The frame member 3 includes first and second lip sections 3a, 3b on its outer side, a web section 3c on its inner side, and a leg section 3d between the lip sections 3a, 3b and the web section 3c. The first lip section 3a is adapted to cover a gap between an automobile body panel and the window plate 2. The second lip section 3b covers the outer peripheral surface of the window plate 2. The web section 3c is arranged opposite to the second lip section 3b, and covers the rear peripheral surface of the window plate 2. These sections 3a, 3b, 3c, 3d constitute a foamed main portion 5 of the frame member 3 including a number of bubbles therein. The foamed main portion 5 is composed of a plasticized synthetic resin material having a relatively high dielectric loss, e.g. polyvinyl chloride (PVC) resin containing dioctylphthalate (DOP) as plasticizer, or suitable elastomer material, such as neoprene or nitryl rubber.

The frame member 3 further includes a non-foamed layer 6 which is arranged on the entire outer surface of the first and second lip sections 3a, 3b and formed integrally with the foamed main portion 5. The non-foamed layer 6 has a uniformly smooth outer surface, and is composed of a synthetic resin material having a sufficient compatibility with the material of the foamed main portion 5. The resin material of the non-foamed layer 6 may be transparent or semi-transparent, or may be of a desired color, such as white.

The frame member 3 is integrally provided with a connection layer 7, which is arranged between the window plate 2 and the surface of the foamed main portion 5 and firmly connected to the window plate 2 with an adhesive material layer therebetween. The connection layer 7 is composed of appropriate hard or semi-hard type synthetic resin material containing either only a relatively small amount of plasticizer or substantially no plasticizer, and having a relatively low dielectric loss, such as PVC or ABS resin. The connection layer 7 of the frame member 3 cooperates with the intermediate film 4 of the window plate 2 to form a fusion-bonded region 8 therebetween.

The front window 1 of the structure mentioned above can be mounted at a predetermined location of an automobile body panel in such a conventional manner that the frame member 3 covers the gap between the window plate 2 and, the automobile body panel. In this connection, the window plate 2 is shown in FIG. 2 as being formed with an opaque printed layer 9 on its rear peripheral surface, which serves to cover an adhesive material layer and an associated dam rubber between the window plate 2 and the automobile body panel such that they are not visible from outside, though not shown in the drawings.

The front window 1 according to the embodiment shown in FIGS. 1 and 2 is particularly advantageous in the following points.

First of all, since the periphery of the window plate 2 is clamped between the lip section 3b and the web section 3c of the frame member 3 which includes a longitudinally continuous foamed main portion 5, it is possible to effectively protect the window plate 2 from damages when it is mounted on the automobile body panel. More particularly, the foamed main portion 5 of the frame member 3 is resiliently deformable, and thus serves to substantially absorb thermal expansion or contraction of the frame body 3 arising upon variation in the ambient temperature, to prevent the window plate 2 from being subjected to severe bending and/or compression stresses, and to distribute external impact forces which may possibly be applied to the window plate 2.

Secondly, the non-foamed layer 6 on the foamed main portion 5 realizes a uniformly smooth outer surface and thus an excellent ornamental appearance of the frame member 3. When the non-foamed layer 6 is composed of a transparent or semi-transparent resin material, the inner foamed main portion 5 is visible from outside through the non-foamed layer 6. When, on the other hand, the non-foamed layer 6 is composed of a colored resin with a desired color, such as white, it may be further formed with strip-like ornamental painted layer of a different color, which is subjected to a subsequent baking. In any case, the painted non-foamed layer functions as a heat insulation layer during the baking step, for preventing excessive expansion of the bubbles in the foamed main portion 5 of the frame member 3.

Finally, the presence of a fusion-bonded region 8 between the intermediate film 4 of the laminated window plate 2 and the connected layer 7 of the frame member 3 ensures that, not only the intermediate film 4 can be prevented from separation from the transparent sheets on both sides thereof, but also an improved sealing property can be readily achieved to positively prevent permeation of water or moisture along the window plate 2. Moreover, it is possible to protect the window plate 2 from damages by preventing the plasticizer within the foamed main body 5 from permeation into gaps between the intermediate film 4 and adhesive material layer on both sides thereof, and also to realize a uniform clamping force of the lip section 3b and the web section 3c.

The automobile window shown in FIGS. 1 and 2 can be manufactured by a method according to the present invention, of which a first embodiment will be explained below. First of all, it is necessary to prepare a window plate 2 and a pre-shaped frame body 11 (FIG. 3) which corresponds to the frame member 3. More particularly, the pre-shaped frame body 11 has a cross-section which is dimensionally somewhat smaller than, but geometrically similar to the frame member 3. The pre-shaped frame body 11 thus includes first and second lip sections 11a, 11b, a web section 11c and a leg section 11d which correspond to the respective sections 3a, 3b, 3c, 3d of the frame member 3. These sections 11a, 11b, 11c, 11d form a main portion 5A of the pre-shaped frame body 11. The pre-shaped frame body 11 further includes an outer layer 6A and a connection layer 7A corresponding to the non-foamed layer 6 and the connection layer 7 of the frame member 3.

Figure 3:
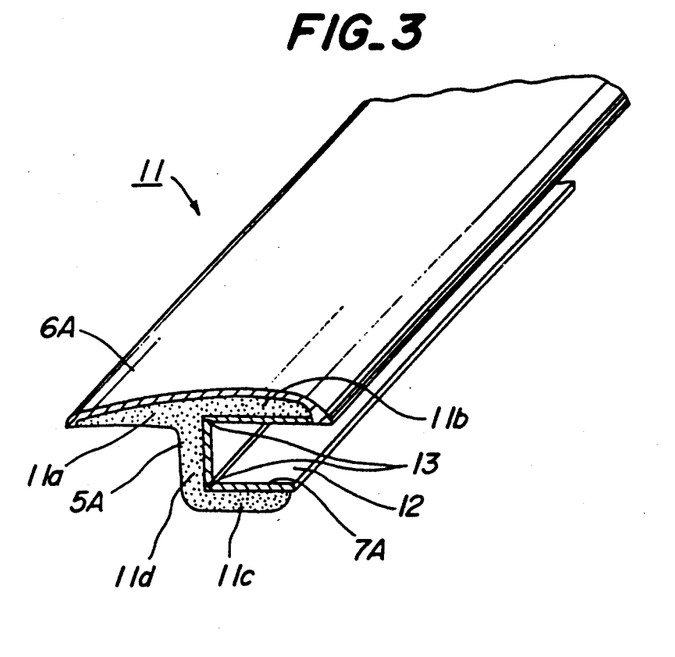
FIG. 3 is a perspective view of a pre-shaped frame body which may be used to manufacture the window shown in FIG. 1.

The pre-shaped frame body 11 may be formed by a multi-layer extrusion process, by extruding the above-mentioned three kinds of thermoplastic synthetic resin materials corresponding to the main portion 5, the non-foamed outer layer 6 and the connection layer 7 of the frame member 3. The extrusion is carried out under such a predetermined temperature condition that the heat foamable agent in the extruded synthetic resin material for the main portion 5 is maintained in a substantially unfoamed state or in a medium foamed state in which it has not reached an ultimately desired expansion degree.

Although the outer layer 6A and the connection layer 7A may be formed separately from the main body 5A of the pre-shaped frame body 11, they are advantageously formed simultaneously with the formation of the main body 5A to reduce the number of parts and production steps and to thereby achieve an improved manufacturing productivity. In this case, the outer layer 6A and the connection layer 7A are preferably composed of thermoplastic synthetic resin materials having a sufficient compatibility with, or being of the same kind as the material of the main body 5A. For example, for the main body 5A of the pre-shaped frame body 11 composed of a plasticized polyvinylchloride resin containing DOP as plasticizer and heat foamable agent, the outer layer 6A may be composed of non-foamable, semi-hard type or plasticized polyvinylchloride resin while the connection layer 7A may be composed of non-foamable, semi-hard or hard type polyvinylchloride resin.

The pre-shaped frame body 11 includes a groove 12 which is defined between the lip section 11b and the web section 11c. The groove 12 has bottom edges formed with slits 13 and the width of the groove 12, i.e. the distance between the lip section 11b and the web section 11c, is slightly greater than the thickness of the window plate 2, so that the edge of the window plate 2 can be readily inserted into the groove 12 by temporarily deflecting the lip and web sections 11b, 11c about the slits 13 to increase the width of the groove 12.

Advantageously, heat activation type adhesive material layers are formed on the inner surfaces of the groove 12 in the pre-shaped frame body 11 synchronously with or after the extrusion thereof, such that they can be activated when heated above a predetermined temperature, to adhere the pre-shaped frame body 11 with the window plate 2. Alternatively, or additionally, the adhesive material layers may be formed on the front and rear surfaces of the window plate 2. One preferred example of the heat activation type adhesive material is a two-component system which includes an acrylic resin component as a main solidification agent and a phenol resin component as a hardening agent.

Figure 4:
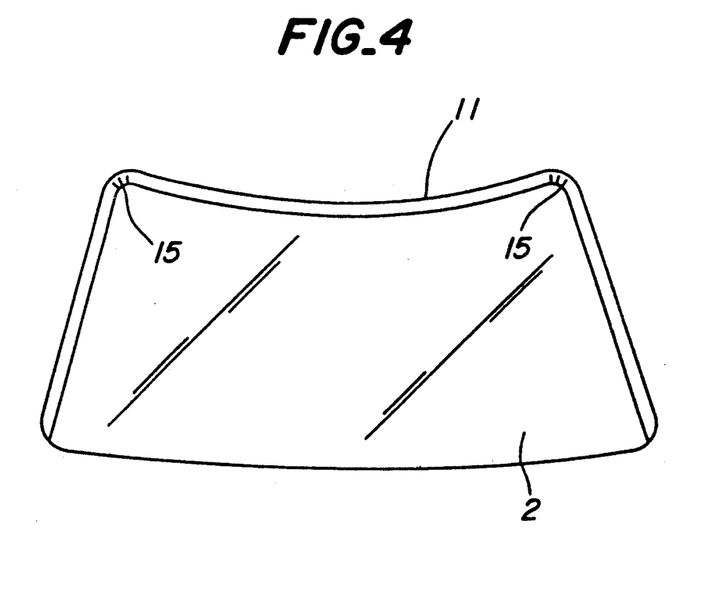
FIG. 4 is a front view of the window during a manufacturing step in which the pre-shaped frame body is temporarily secured to the window plate.

In the next step, as shown in FIG. 4, the pre-shaped frame body 11 is temporarily secured to the edge of the window plate 2 by an appropriate mechanical means. To this end, when the periphery of the window plate 2 has corner regions with a substantial radius of curvature, an elongate pre-shaped frame body 11 may be used to continuously cover the upper and side edges of the window plate 2 by bending the pre-shaped frame body 11 into the curvature of the corner regions of the window plate 2 without undesirable deformation. When, on the other hand, the periphery of the window plate 2 has corner regions with a relatively small radius of curvature, the elongate pre-shaped frame body 11 may be used to continuously cover the edges of the window plate 2 by forming a series of substantially V-shaped notches 15 in those regions of the pre-shaped frame body 11 corresponding to the corner regions of the window plate 2, thereby to facilitate subsequent bending of the pre-shaped frame body 11 into the curvature of the corner regions of the window plate 2. Alternatively, as will be described hereinafter, the pre-shaped frame body 11 may be cut into a predetermined length, and then secured to the edge of the window plate 2 with the longitudinal ends of the neighbouring pre-shaped bodies 11 in abutment with each other.

Figure 5:
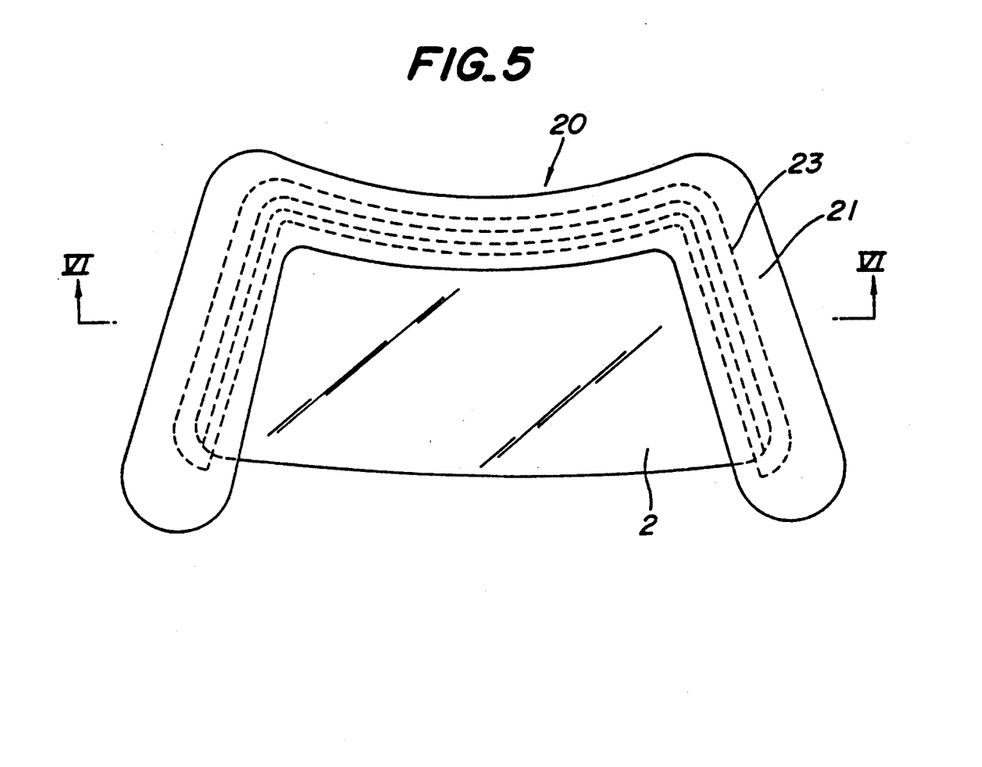
FIG. 5 is a front view of the mold which may be used to manufacture the window shown in FIG. 1.
Figure 6:
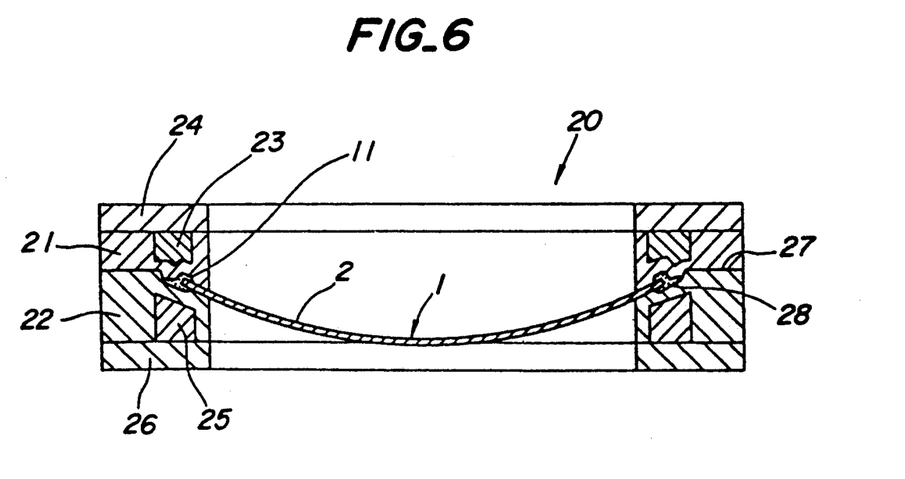
FIG. 6 is a sectional view taken along the line VI—VI in FIG. 5.
Figure 7:
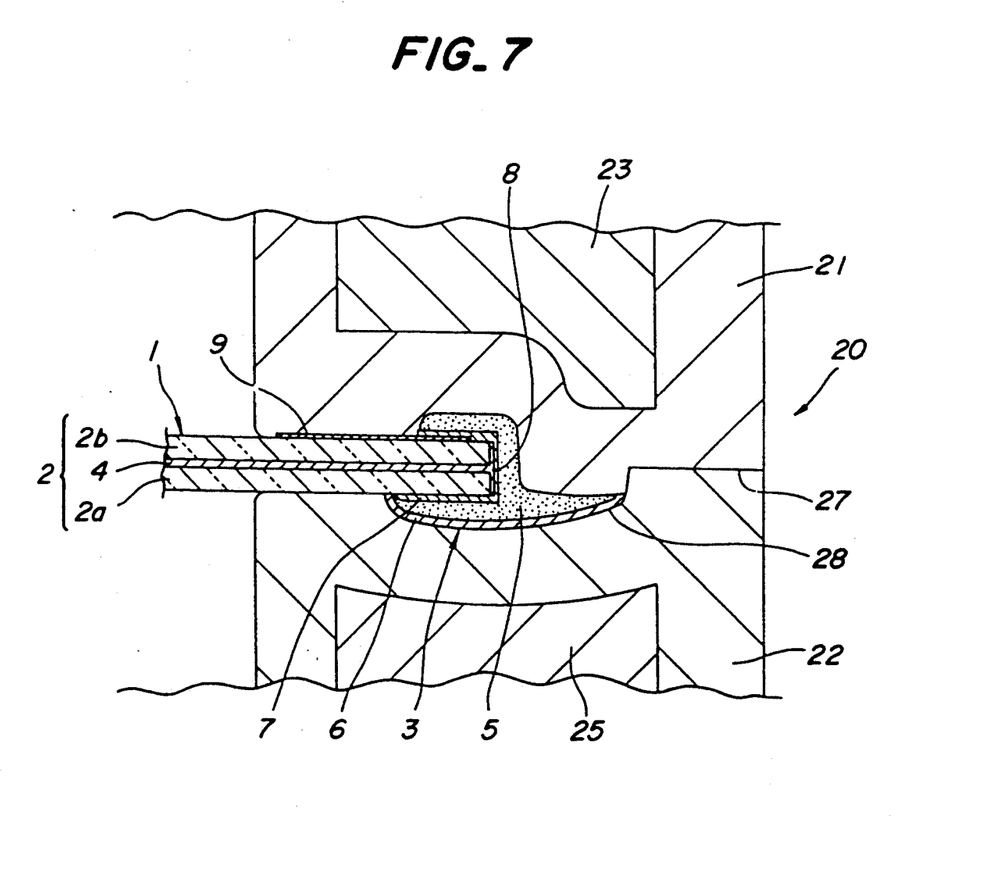
FIG. 7 is a sectional view of the mold in an enlarged scale.

Thereafter, as shown in FIGS. 5 to 7, the pre-shaped frame body 11 is brought into a mold 20 together with the side and upper edges of the window plate 2. The mold 20 includes upper and lower mold halves 21, 22 with a configuration corresponding to the peripheral contour of the window plate 2. The upper mold half 21 is provided with an upper electrode 23 which is held in position by means of a holder plate 24. Similarly, the lower mold half 22 is provided with a lower electrode 25 which is held in position by means of a holder plate 26. The two mold halves 21, 22 are tightly engageable with each other along a parting surface 27, to define a mold cavity 28 therebetween. The mold halves 21, 22 are composed of a material with a relatively low dielectric loss, such as silicone- or polyolefin-based resin or, as the case may be, appropriate ceramic material. The electrodes 23, 25 are arranged in the regions of the mold halves 21, 22 corresponding to the frame member 3 on the window plate 2. The electrodes 23, 25 are each shaped to have a width which is greater than the horizontal width of the cavity 28, and spaced therefrom by as constant distance as possible at any location of the electrodes. The cavity 28 of the mold 20 includes side and upper regions connected with each other, which correspond to the side and upper regions of the window frame member 3, respectively.

After the pre-shaped frame body 11 has been brought into the cavity 28 together with the relevant edges of the window plate 2, the two mold halves 21, 22 are tightened with each other. The electrodes 23, 25 are then applied with high frequency voltage so that the main body 5A of the pre-shaped frame body 11 composed of a material with a higher dielectric loss is heated to a predetermined temperature. By this, the foamable agent contained in the thermoplastic synthetic resin material forming the main body 5A of the pre-shaped frame body 11 is caused to evaporate, inducing the expansion of the entire main body 5A of the pre-shaped frame body 11 in the mold cavity 28. When the main body 5A and the outer layer 6A of the pre-shaped frame body 11 are both composed of plasticized polyvinylchloride resin, they can be heated to a required temperature within a relatively short time due to a higher dielectric loss, accompanying formation of bubbles in the main body 5A; they can thus be readily fusion-bonded with each other. On this occasion, the bubbles in the skin layer of the main body 5A are interrupted by the non-foamed outer layer 6A, without deteriorating the desired, uniformly smooth ornamental appearance of the frame member 3.

In this connection, it is often preferable to place the window plate 2 within the mold 20 with its outer surface side directed vertically downwards. The placement of the window plate 2 with such an orientation not only facilitates the positioning of the window plate 2 relative to the mold 20 to improve the manufacturing productivity, but also serves to avoid accumulation of bubbles in that interior region of the main portion 5A which is adjacent to the outer surface layer 6A, since the bubbles tend to move vertically upwardly, i.e. away from the outer surface layer 6A.

The connection layer 7A of the pre-shaped frame body 11, as mentioned above, is composed of a material having a relatively low dielectric loss when compared with the main body 5A, and is thus heated relatively slowly. This means that the connection layer 7A serves to prevent an excessive heat transfer from the main body 5A placed under an elevated temperature to the intermediate film 4 of the window plate 2 to protect the film 4 from thermal damages.

The intermediate film 4 itself is composed of a synthetic resin material, such as the above-mentioned polyvinylbutyral resin, having a relatively low dielectric loss which is substantially same with, or slightly lower than that of the connection layer 7A. This means that the intermediate film 4 begins to be substantially heated by the heat transferred from the main body 5A to form a fusion-bonded region 8 with the connection layer 7A under a moderate temperature condition, after the connection layer 7A has reached its softening temperature to assume a molten state. In order to realize a fusion-bonded region 8 over a sufficient surface area, it is generally preferable for the intermediate film 4 to have a marginal area exposed outside of the window plate 2 with a sufficient width.

During the above-mentioned dielectric heating of the main body 5A of the pre-shaped frame body 11, it is of course that the adhesive material layers arranged between the pre-shaped frame body 11 and the window plate 2 are activated to integrally connect them with each other.

The application of the high frequency voltage to the electrodes 23, 25 of the mold 20 does not result in a significant heating of the mold 20 composed of a material with a lower dielectric loss as mentioned above. The mold 20 can thus be maintained at a relatively low temperature, without being accompanied by softening of the mold 20 or deformation of the cavity 28. The window plate 2 in the mold cavity 28 can be protected from damages, since it is only acted upon by a relatively low expansion pressure of the foamable agent contained in the thermoplastic synthetic resin material forming the main portion 5A of the pre-shaped frame body 11, as compared with a conventional higher injection pressure. Moreover, as the mold 20 need not withstand a higher inner pressure, it may be of a less expensive and less complicated structure.

After stopping the application of high frequency voltage and subjecting the frame member 3 to cooling and solidification, the mold halves 21, 22 are disengaged from each other to take out of the mold 20 the window 1 in its complete form in which a frame member 3 is integrally formed on the window plate 2.

Another embodiment of the automobile window according to the present invention will be explained below, with reference to FIGS. 8 to 12. The automobile window 1 of this embodiment is generally the same as the window shown in FIGS. 1 and 2, and differs therefrom essentially in that a strip-like ornamental portion 10 is integrally provided on the non-foamed layer 6 or the main body 5 of the frame member 3, as particularly shown in FIGS. 8 and 9. The ornamental portion 10 includes longitudinal edge regions which are covered by longitudinal cover regions 16 of the non-foamed layer 6. The remaining central region of the ornamental portion 10 is exposed as being visible from outside, and has a width which may be substantially constant throughout its entire length.

Figure 10:
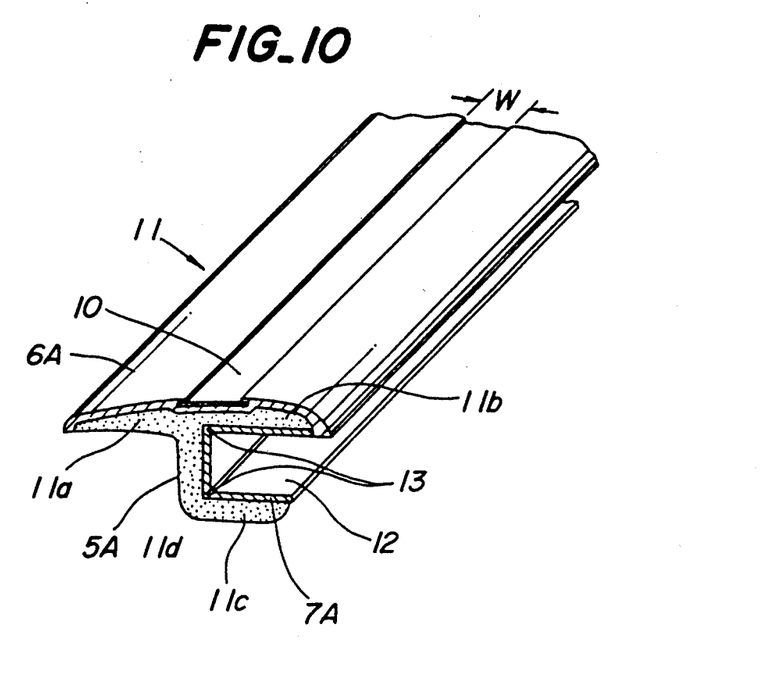
FIG. 10 is a perspective view similar to FIG. 3, but showing a pre-shaped frame body which may be used to manufacture the window shown in FIG. 9.

The ornamental portion 10 is preferably formed during the preparation of the pre-shaped frame body 11, e.g. by applying onto part of the outer surface layer 6A of the pre-shaped frame body 11 a strip-like film, tape, foil or the like, which may be of a color different from that of the pre-shaped frame body 11. The ornamental portion 10 may thus be composed of a transparent, semi-transparent or appropriately colored tape. Also, when a metal-lustrous appearance of the ornamental portion 10 is desired, it may be composed of a laminated tape including an inner metal deposition layer or metal foil strip, such as a strip of a stainless steel foil.

Figure 11A:
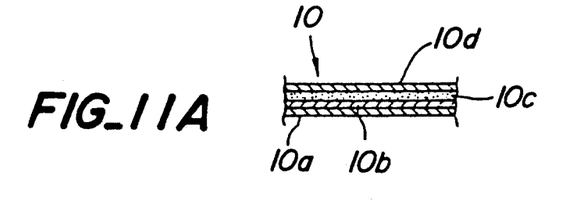
FIGS. 11A and 11B are sectional views showing some examples of the ornamental portion in the pre-shaped frame body shown in FIG. 10.

There is shown in FIG. 11A one example of the ornamental portion 10 which includes an innermost base resin layer 10a composed of a resin having a sufficient compatibility with the material of the outer surface layer 6A, or with the material of the main portion 5A when the ornamental portion 10 is directly applied onto the main portion 5A, a plasticized resin layer 10b composed of ionomer resin or the like, a metal deposition layer 10c composed of chromium, aluminum or the like, and an outermost resin layer 10d composed of vinylidenefluoride resin or the like having sufficient weatherability and heat resistivity, which layers 10a–10d are laminated with each other in the stated sequence. The ornamental portion 10 shown in FIG. 11A can be readily bent or deformed within its plane in a two-dimensional sense, into conformity with the curvature along the corner regions of the window plate 2.

Figure 11B:
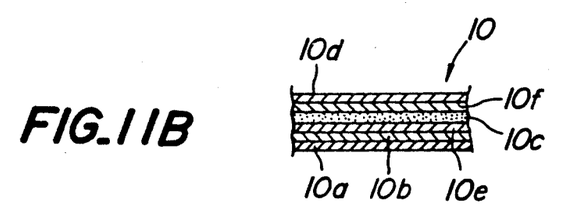

Another example of the ornamental portion 10 is shown in FIG. 11B, which is basically same as the previous one and slightly different therefrom as the it further includes an adhesive material layer 10e between the metal deposition layer 10c and the plasticized resin layer 10b, as well as a relatively rigid resin layer 10f composed of polyethylene-terephthalate (PET) resin or the like and arranged between the metal deposition layer 10c and the resin layer 10d. The rigid resin layer 10f serves to improve the tensile strength of the ornamental portion 10. The ornamental portion 10 with the arrangement shown in FIG. 11B is thus advantageous particularly when the ornamental portion 10 needs to be present along the straight edges of the window plate 2 only. However, the ornamental portion 10 shown in FIG. 11B may be used also when it has to be bent within its plane, into conformity with the curvature along the corner regions of the window plate 2, by eliminating the rigid resin layer 10f, or by substantially reducing the thickness of the rigid resin layer 10f to be within a range of 5–10 μm.

Still another example of forming the ornamental portion 10, though not shown in the drawings, is a multi-layer extrusion process to extrude during the formation of the pre-shaped frame body 11 an additional thermoplastic synthetic resin material for the ornamental portion 10, which is of a desired color different from that of the outer surface layer 6A.

Figure 8:
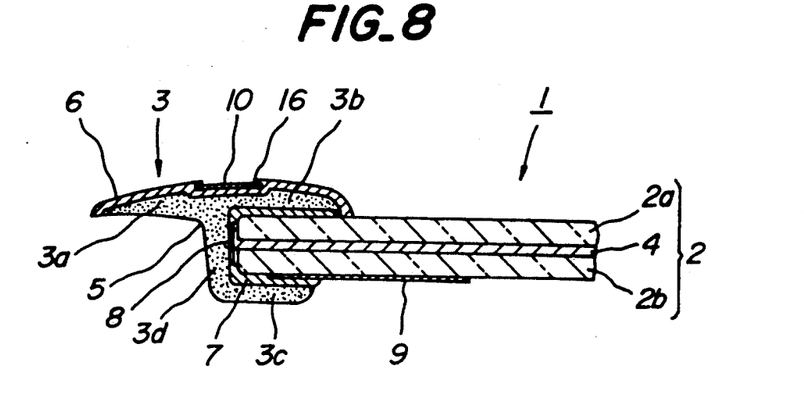
FIG. 8 is a cross-sectional view similar to FIG. 2, but showing the automobile front window according to another embodiment of the present invention.
Figure 9:
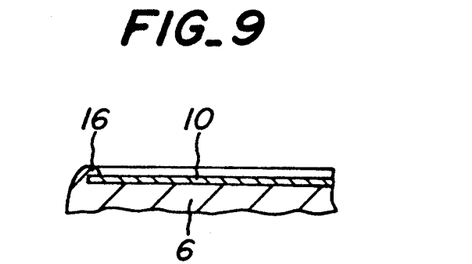
FIG. 9 is a longitudinal-sectional view of the longitudinal end region of the frame member in the window shown in FIG. 8.

The method for manufacturing the automobile window according to the embodiment shown in FIGS. 8 and 9 also makes use of a mold 20, which is generally same as that shown in FIGS. 5–7 but slightly different therefrom due to the formation of the ornamental portion 10. More particularly, as shown in FIGS. 12 and 13, the mold 20 includes a lower mold half 22 whose inner surface defining the mold cavity 28 is integrally provided with a ridge 22a corresponding to the central region of the ornamental portion 10 to be exposed outside.

Assuming that the ornamental portion 10 in the pre-shaped frame body 11 has a central region of a constant nominal width W, the ridge 22a of the lower mold half 22 may have a width $W_1$ which is substantially same as the above-mentioned nominal width W. Preferably, however, the width $W_1$ of the ridge 22a is slightly smaller than the nominal width W of the central region of the ornamental portion 10 in the pre-shaped frame body 11, as shown in FIG. 12, since it then becomes possible to automatically compensate for possible fluctuation in the nominal width W, or in the position of the pre-shaped frame body 11 relative to the window plate 2 when they are temporarily connected with each other.

After the window plate 2 together with a pre-shaped frame body 11 temporarily connected thereto has been placed in the mold 20, the upper and lower electrodes 23, 25 are applied with high frequency voltage in the manner substantially described above with reference to the previous embodiment. On this occasion, when the ridge 22a on the lower mold half 22 has a width $W_1$ which is smaller than the nominal width W of the central region of the ornamental portion 10, as discussed above and shown in FIG. 12, the material forming the longitudinal edges or the cover region 16 of the outer surface layer 6A, after it has reached the softening temperature, is forced into abutment with side walls of the ridge 22a to realize a desired constant width $W_1$ of the central region of the ornamental portion 10 on the finished frame member 3.

Figure 12:
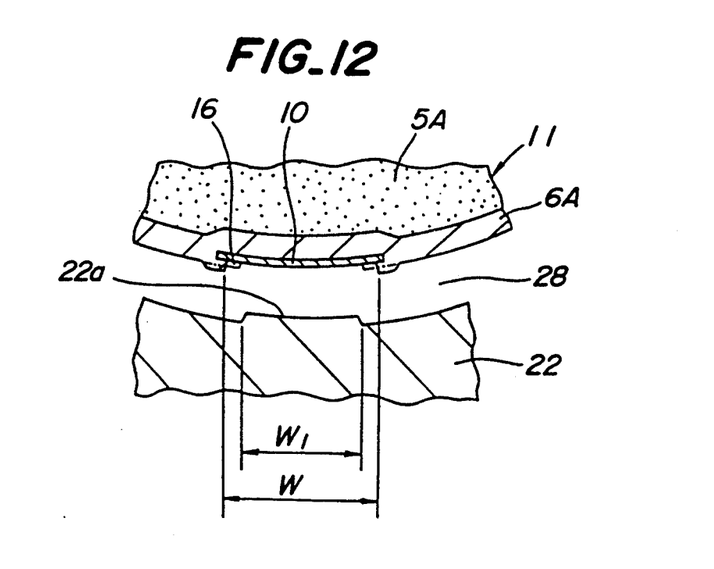
FIG. 12 is a sectional view for explaining the relation between the ornamental portion of the pre-shaped frame body and the ridge on the lower mold half.
Figure 13:
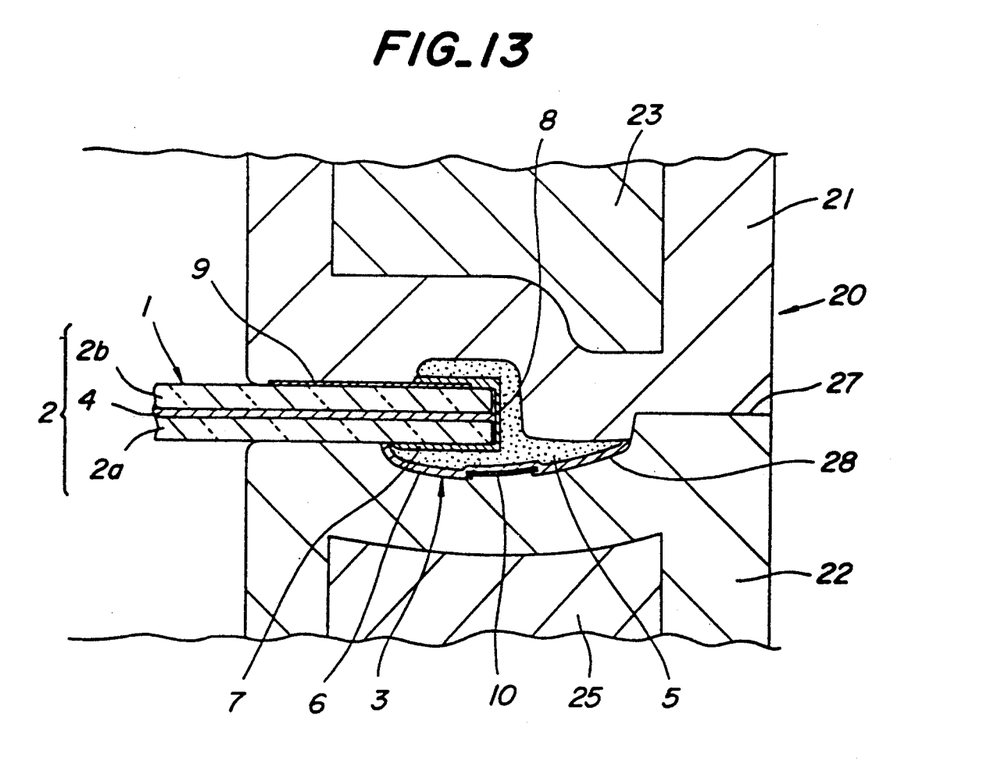
FIG. 13 is a sectional view similar to FIG. 7, but showing the mold which may be used to manufacture the window shown in FIG. 9.

In order to readily realized a refined appearance of the ornamental portion 10, the longitudinal edges of the cover regions 16 on the outer surface layer 6A of the pre-shaped frame body 11 may be slightly projected from the general surface of the layer 6A, as shown by solid lines in FIG. 12. In this case, the cover regions 16 with the projected longitudinal edges are heated above the softening temperature of the material forming the outer surface layer 6A, during the application of high frequency voltage to the electrodes 23, 25 of the mold 20, and can be deformed into abutment with the side walls of the ridge 22a, as represented by imaginary lines in FIG. 12, without forming undesirable unevenness on the outer surface of the non-formed layer 6 in the finished frame member 3. The ornamental portion 10 has longitudinal end regions which, like the longitudinal edge regions thereof, are covered by the cover regions 16, as shown in FIG. 9.

The above-mentioned method of manufacturing automobile windows shown in FIGS. 8 and 9 is particularly advantageous in that the ornamental portion 10 integrally formed on the outer surface layer 6A of the pre-shaped frame body 11 can be exposed outside of the frame member 3 with a desired excellent linearity and constant width $W_1$ due to the provision of the ridge 22a on the lower mold half 22, and that the ornamental portion 10 can be firmly and stably held in the predetermined location of the non-foamed layer 6 of the frame member 3 without the risk of undesirable dislocation or separation.

The automobile front window shown in FIGS. 8 and 9 may be modified such that the non-foamed layer 6 of the frame member 3 includes an ornamental portion 10 with a longitudinally variable width, in order to satisfy various design requirements often imposed on the frame member 3. The window 1 according to the modified embodiment is shown in FIGS. 14A and 14B, and includes a frame member 3 with an ornamental portion 10 on the non-foamed layer 6 having a relatively large exposed width $W_2$ along the side edges 2a of the window plate 2 (FIG. 14A), and a relatively small exposed width $W_3$ along the upper edge 2b of the window plate 2 (FIG. 14B).

Figure 14A:
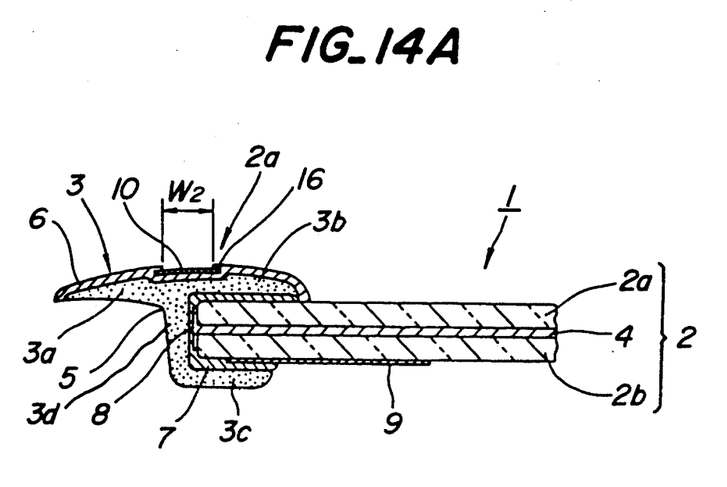
FIGS. 14A and 14B are sectional views similar to FIG. 8, but respectively showing side and upper edge regions of the automobile front window according to still another embodiment of the present invention.
Figure 14B:
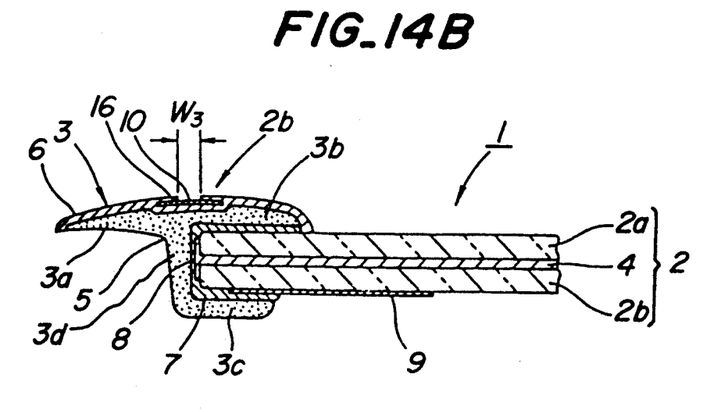
Figure 15A:
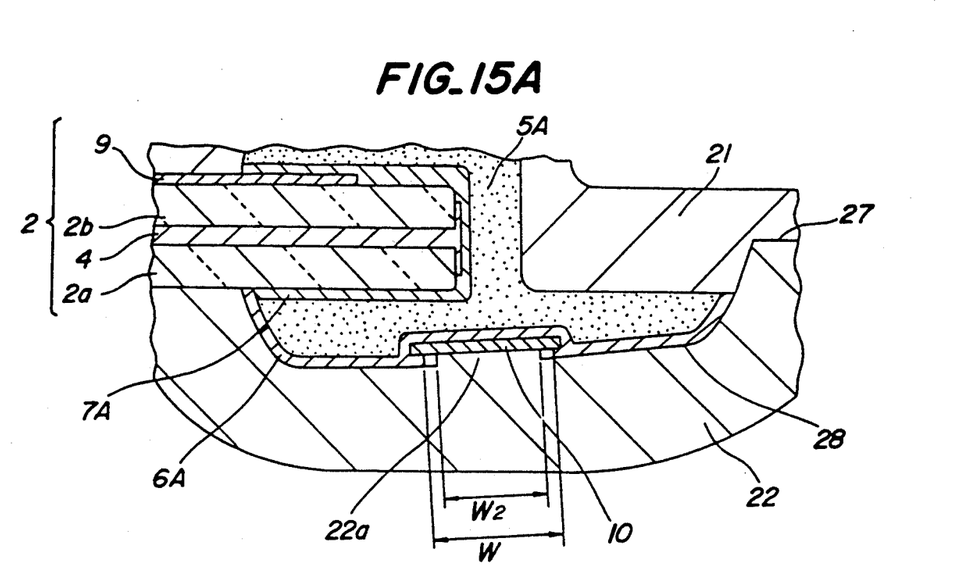
FIGS. 15A and 15B are sectional views similar to FIG. 13, but respectively showing the side and upper regions of the mold which may be used to manufacture the window shown in FIGS. 14A and 14B.
Figure 15B:
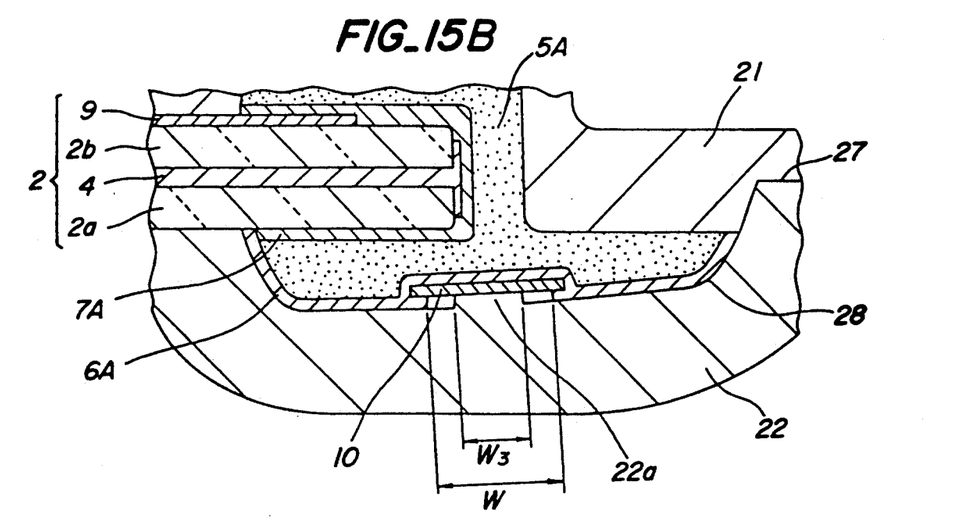

In manufacturing the automobile front window shown in FIGS. 14A and 14B, the pre-shaped frame body 11 is prepared to have an ornamental portion 10 on the outer surface layer 6A, which includes a central region exposed outside with a longitudinally constant width W in the manner explained above with reference to FIG. 10. The pre-shaped frame body 11 is temporarily secured to the window plate 2, and is placed in a mold 20 shown in FIGS. 15A and 15B, including the upper and lower mold halves 21, 22 of which the lower mold half 22 is provided with a ridge 22a corresponding to the ornamental portion 10 of the frame member 3, as in the previous embodiment. The ridge 22a has a relatively large width $W_2$ along the side edges 2a of the window plate 2 (FIG. 15A), and a relatively small width $W_3$ along the upper edge 2b thereof (FIG. 15B). While the relatively large width $W_2$ of the ridge 22a may be substantially same as the constant exposed width W of the ornamental portion 10 in the pre-shaped frame body 11, it is preferably smaller than the latter. Furthermore, depending upon ornamental design requirement, the ridge 22a may be eliminated along the upper edge 2b of the window plate 2, in which case the width $W_3$ is to be regarded as zero. Thus, the dimensional relationship may be expressed as $W \geq W_2 \geq W_3 \geq 0$.

Except for the above-mentioned differences, the automobile window 1 shown in FIGS. 14A and 14B can be manufactured essentially in the manner described with reference to the previous embodiments. The frame member 3 in the finished window 1 includes an ornamental portion 10 on its non-foamed layer 6 which is exposed outside with a longitudinally variable width $W_2$, $W_3$ to readily realize a unique ornamental appearance satisfying certain ornamental design requirement imposed on the frame member 3.

The present invention may be applied not only to automobile front windows, but also to rear or side windows or even windows for a sun roof. When manufacturing such windows, as mentioned hereinbefore with reference to FIG. 4, an elongate pre-shaped frame body 11 may be temporarily secured to the relevant edges of the window plate 2 by bending the pre-shaped frame body 11 along the corner regions of the window plate 2. However, when the window plate 2 has a corner region with a relatively small radius of curvature, as is the case for the corner region between the lower edge and rear side edge of a side window for two-door type automobiles, the forced bending of the pre-shaped frame body 11 along the corner region of the window plate 2 may result in insufficient total amount of the material and unsatisfactory expansion degree of the foamed main portion 5 in the corner region of the frame member 3.

Figure 18:
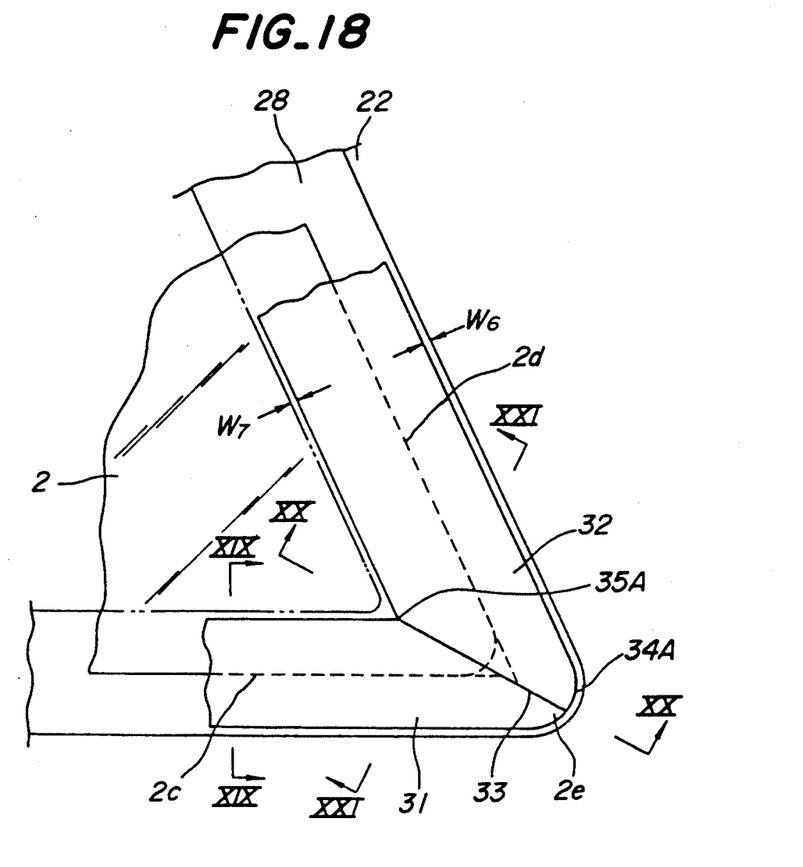
FIG. 18 is a fragmentary view corresponding to FIG. 17 and showing the rear side window during a manufacturing step in which the pre-shaped frame bodies are temporarily secured to the window plate.
Figure 19:
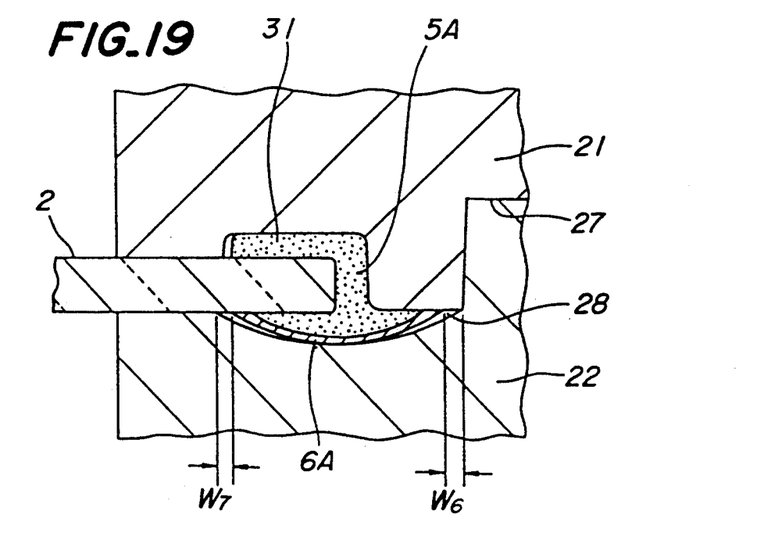
FIGS. 19, 20 and 21 are sectional views of the mold taken along the lines XIX—XIX, XX—XX and XXI—XXI in FIG. 18.
Figure 20:
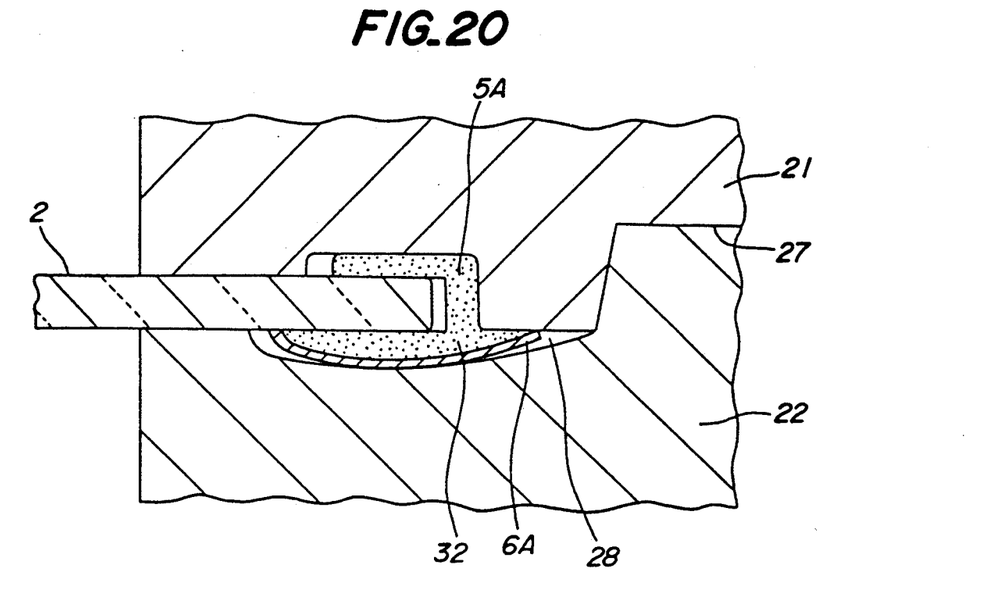
Figure 21:
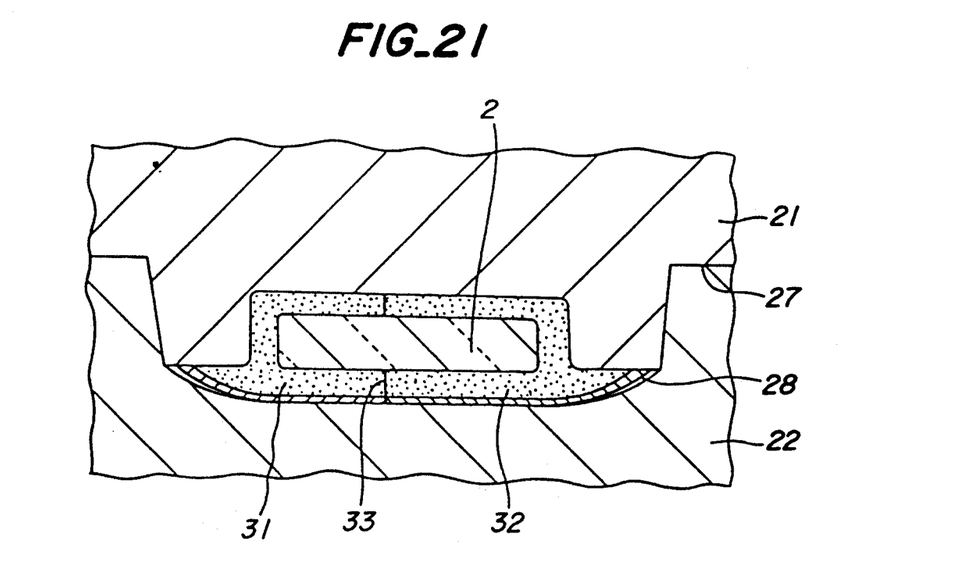

The above-mentioned drawback can be eliminated by still another embodiment of the present invention, which will be explained hereinafter with reference to FIGS. 18 to 21. There is shown in FIGS. 18 and 19 a side window 1 for two-door type automobiles, which includes a window plate 2 with a lower edge 2c, a rear side edge 2d and a corner region 2e therebetween. The frame member 3 has a width $W_4$ along the lower edge 2c of the window plate 2, and a width $W_5$ along the rear side edge 2d which is illustrated as being different from the width $W_4$. The frame member 3 may then be formed of at least two kinds of pre-shaped frame bodies 31, 32 which are integrally connected with each other at a joint 33 in the corner region 2e of the window plate 2. Each pre-shaped frame body 31, 32 is essentially same as that shown in FIG. 3. The frame member 3 has outer and inner corner regions 34, 35 at the joint 33, through which the lower and side regions of the frame member 3 are continuously connected with each other.

Figure 16:
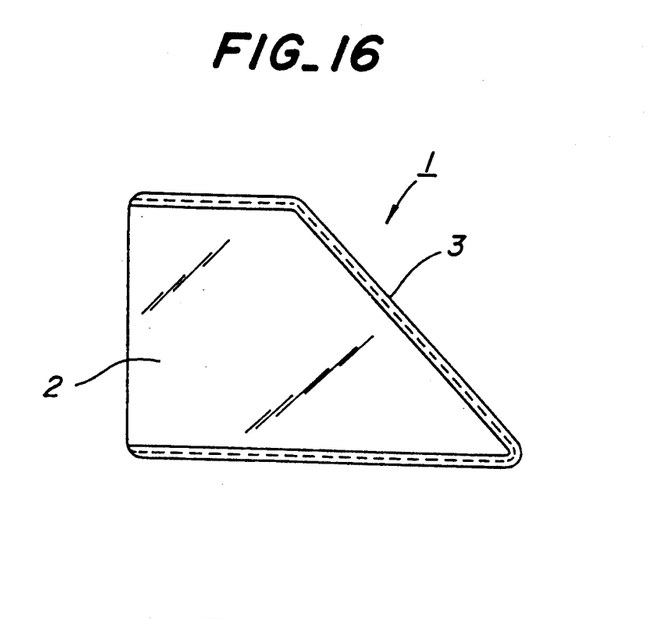
FIG. 16 is a front view showing an automobile rear side window according to still another embodiment of the present invention.
Figure 17:
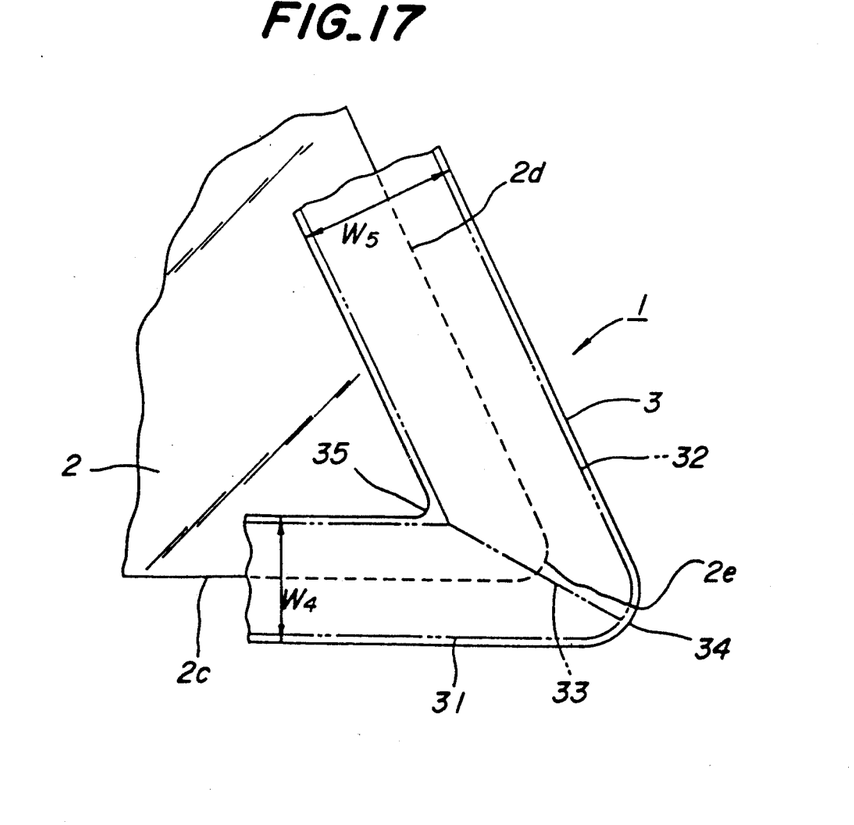
FIG. 17 is a fragmentary view of the rear side window, showing the corner region of the window in an enlarged scale.

To manufacture the rear side window 1 shown in FIGS. 16 and 17, as mentioned above, a pre-shaped frame body 31 with a width $W_4$, and another pre-shaped frame body 32 with a width $W_5$ are separately prepared and cut into respectively predetermined length to have oblique end region to form the joint 33. These pre-shaped frame bodies 31, 32 are temporarily secured to the respective edges 2c, 2d of the window plate 2, preferably with the end regions in abutting engagement with each other, and are placed in the mold 20 as shown in FIGS. 18 to 21, essentially in the manner described with reference to the previous embodiments. On this occasion, a small clearance may be left between the end regions of the pre-shaped frame bodies 31, 32. Also, small clearances of width $W_6$, $W_7$ may be left on both sides of each pre-shaped frame body 31, 32 placed in the mold 20, between the pre-shaped frame body 31, 32 and the mold cavity 28. The width $W_6$, $W_7$ may be on the order of 0.5 to 2 mm for the frame member 3 with a width on the order of 5 to 50 mm.

When high frequency voltage is applied to the upper and lower electrodes 23, 25 of the mold 20, the clearances of the width $W_6$, $W_7$ are filled with the synthetic resin material of the pre-shaped frame bodies 31, 32 subjected to expansion which has been induced by the dielectric heating explained hereinbefore with reference to the previous embodiments. At the same time, on the outer and inner sides of the joint 33, the synthetic resin material of the pre-shaped frame bodies 31, 32 in the corner region 2e of the window plate 2 is caused to swell out to form the outer and inner corner regions 34, 35 each having a predetermined radius of curvature. The rear side window shown in FIGS. 16 and 17 can otherwise be manufactured essentially in the manner described with reference to the previous embodiments.

It will be readily appreciated from the foregoing description that, in accordance with the present invention, there is provided a novel and improved window for automobiles or the like, which includes a frame member arranged integrally with the window plate and having a smooth and uniform ornamental appearance, and which can be readily manufactured without accompanying damages to the window plate or without deteriorating a smooth and uniform ornamental appearance of the frame member.

While the present invention has been described with reference to certain specific embodiments presented by way of examples only, those skilled in the art will readily appreciate that various modifications and/or alterations may be made without departing from the scope of the invention.

What is claimed is:

1. A window for automobiles or the like, including a window plate and a frame member formed into a predetermined shape to be integral with the window plate along at least one edge thereof, wherein said frame member comprises a profiled main portion, having a lower leg and a top, for covering a gap between said window plate and an automobile body panel, the lower leg of the main portion being shaped to fit into said gap and the top of the main portion having a first lip section for covering said body panel and a second lip section for covering a peripheral portion of said window plate, said main portion having at least an outer side thereof extending over said first and second lips, said main portion being formed of a non-injection molded foamed thermoplastic synthetic resin material; a surface layer on at least said outer side and having inner and outer surfaces, the inner surface of said surface layer being bonded to the outer side of said main portion for covering the outer side of said main portion and preventing any bubbles formed by the foaming action of a heat-foamable agent in said main portion form affecting the appearance of said outer surface of said surface layer, said surface layer comprising a non-foamed thermoplastic synthetic resin material.

2. The window as claimed in claim 1, wherein said frame member comprises a polyvinyl-chloride resin.

3. The window as claimed in claim 1 or 2, wherein said non-foamed thermoplastic synthetic resin material forming the surface layer is a transparent resin.

4. The window as claimed in claim 1 or 2, wherein said non-foamed thermoplastic synthetic resin material forming the surface layer is a semi-transparent resin.

5. The window as claimed in claim 1 or 2, wherein said surface layer is of a first color as a whole, and has a local surface portion of a second color which is different from said first color.

6. The window as claimed in claim 1 or 2, wherein said surface layer is provided with a longitudinally continuous ornamental portion adhered in its entirety to the outer surface of the surface layer.

7. The window as claimed in claim 6, wherein said ornamental portion comprises a strip integrally adhered to said non-foamed surface layer.

8. The window as claimed in claim 6, wherein said ornamental portion comprises thermoplastic synthetic resin material which has been coextruded with the thermoplastic synthetic resin material of said surface layer and is different in color therefrom.

9. The window as claimed in claim 6, wherein said ornamental portion has longitudinal edges embedded in the thermoplastic synthetic resin material of said surface layer such that remaining region of the ornamental portion is exposed as being visible from outside.

10. The window as claimed in claim 9, wherein said remaining region of the ornamental portion exposed as being visible from outside has a width which varies in the longitudinal direction thereof.

11. The window as claimed in claim 1 or 2, wherein said window plate is of a laminated structure including an intermediate film composed of a transparent and adhesive thermoplastic synthetic resin material and arranged between a pair of transparent sheets.

12. The window as claimed in claim 1 or 2, wherein a connection layer is arranged between the window plate and the frame member, which connection layer comprises a hard or semi-hard type synthetic resin material containing substantially no plasticizer or a relatively small amount of plasticizer.

13. The window as claimed in claim 1 or 2, wherein said window plate is of a laminated structure including an intermediate film comprising a transparent and adhesive thermoplastic synthetic resin material and arranged between a pair of transparent sheets, and wherein a connection layer is arranged between the window plate and the frame member, which is composed of a hard or semi-hard type synthetic resin material containing substantially no plasticizer or a relatively small amount of plasticizer and which forms a fusion-bonded region with the intermediate film of the window plate.

14. The window of claim 1 in which the material of the surface layer is sufficiently compatible with the material of the main portion so that the surface layer is firmly fusion-bonded to the main portion without an adhesive agent.

15. A window for automobiles or the like, including a window plate and a frame member formed into a predetermined shape to be integral with the window plate along at least one edge thereof, wherein said frame member comprises a profiled main portion, having a lower leg and a top, for covering a gap between said window plate and an automobile body panel, the lower leg of the main portion being shaped to fit into said gap and the top of the main portion having a first lip section for covering said body panel and a second lip section for covering a peripheral portion of said window plate, said main portion having at least an outer side thereof extending over said first and second lips, said main portion having at least an outer side extending over said first and second lips, said main portion being formed of a high dielectric loss, foamed thermoplastic synthetic resin material; a surface layer for covering the outer side of said main portion, said surface layer preventing any bubbles formed by the foaming action of a heat-foamable agent in said main portion from affecting the appearance of the outer surface of said surface layer, said surface layer comprising a relatively low dielectric loss, non-foamed thermoplastic synthetic resin material.

16. The window of claim 15 in which the material of the surface layer is sufficiently compatible with the material of the main portion so that the surface layer is firmly fusion-bonded to the main portion without an adhesive agent.

* * * * *